United States Patent
Jiang et al.

(10) Patent No.: US 11,908,222 B1
(45) Date of Patent: Feb. 20, 2024

(54) OCCLUDED PEDESTRIAN RE-IDENTIFICATION METHOD BASED ON POSE ESTIMATION AND BACKGROUND SUPPRESSION

(71) Applicant: Hangzhou Dianzi University, Hangzhou (CN)

(72) Inventors: Ming Jiang, Hangzhou (CN); Lingjie He, Hangzhou (CN); Min Zhang, Hangzhou (CN)

(73) Assignee: Hangzhou Dianzi University, Hangzhou (CN)

( * ) Notice: Subject to any disclaimer, the term of this patent is extended or adjusted under 35 U.S.C. 154(b) by 0 days.

(21) Appl. No.: 18/488,146

(22) Filed: Oct. 17, 2023

(30) Foreign Application Priority Data

Dec. 13, 2022 (CN) .......................... 202211593464.9

(51) Int. Cl.
    *G06V 40/10* (2022.01)
    *G06V 10/82* (2022.01)
    *G06V 10/46* (2022.01)
    *G06T 5/20* (2006.01)
    *G06T 7/70* (2017.01)

(52) U.S. Cl.
    CPC .............. *G06V 40/103* (2022.01); *G06T 5/20* (2013.01); *G06T 7/70* (2017.01); *G06V 10/462* (2022.01); *G06V 10/82* (2022.01)

(58) Field of Classification Search
    None
    See application file for complete search history.

(56) References Cited

U.S. PATENT DOCUMENTS

| 10,657,364 B2 * | 5/2020 | El-Khamy | G06V 10/82 |
| 11,699,290 B1 * | 7/2023 | Wang | G06V 10/454 |
| | | | 382/103 |

(Continued)

FOREIGN PATENT DOCUMENTS

| CN | 113128461 A | 7/2021 |
| CN | 113361334 A | 9/2021 |
| CN | 114120363 A | 3/2022 |

(Continued)

OTHER PUBLICATIONS

Ma et al. "Pose-guided Inter- and Intra-part Relational Transformer for Occluded Person Re-Identification", MM '21, Oct. 20-24, 2021 (Year: 2021).*

(Continued)

*Primary Examiner* — Randolph I Chu (57) ABSTRACT

The present application relates to an occluded pedestrian re-identification method, including steps of obtaining global features and local features of occluded pedestrians, and recombining the local features into a local feature map; obtaining a heat map of key-points of pedestrian images and a group of key-point confidences, obtaining a group of features of the pedestrian key-points by using the local feature map and the heat map; obtaining a local feature group by using the global features to enhance each key-point feature in the group of features of pedestrian key-points according to Conv, and an adjacency matrix of key-points is obtained through the key-points, the local feature group and the adjacency matrix of key-points are used as the input of GCN to obtain the final features of pedestrian key-points.

9 Claims, 4 Drawing Sheets

(56) References Cited

U.S. PATENT DOCUMENTS

| | | | | |
|---|---|---|---|---|
| 11,835,951 B2 * | 12/2023 | Djuric | ............. | B60W 60/00274 |
| 2022/0066544 A1 * | 3/2022 | Kwon | ....................... | G06T 7/20 |

FOREIGN PATENT DOCUMENTS

| | | |
|---|---|---|
| CN | 115050048 A | 9/2022 |
| CN | 115311619 A | 11/2022 |
| CN | 115497122 A | 12/2022 |
| JP | 2022174707 A | 11/2022 |
| WO | 2022236668 A1 | 11/2022 |

OTHER PUBLICATIONS

Wang et al. "Key point-aware occlusion suppression and semantic alignment for occluded person re-identification", Information Sciences 606 (2022) 669-687 (Year: 2022).*

Liu et al. "Pose-Guided Feature Disentangling for Occluded Person Re-identification Based on Transformer", The Thirty-Sixth AAAI Conference on Artificial Intelligence (AAAI-22) (Year: 2022).*

Xu et al. "Learning Feature Recovery Transformer for Occluded Person Re-Identification", IEEE Transactions on Image Processing, vol. 31, 2022 (Year: 2022).*

Li et al. "Diverse Part Discovery: Occluded Person Re-identification with Part-Aware Transformer", CVPR 2021 (Year: 2021).*

Zhou et al. "Motion-Aware Transformer For Occluded Person Re-identification", 2202.04243v2 [cs.CV] Feb. 10, 2022 (Year: 2022).*

Zheng et al. "Person Re-identification: Past, Present and Future", Journal of Latex Class Files, vol. 14, No. 8, Aug. 2015 (Year: 2015).*

Zhao et al. "Short range correlation transformer for occluded person reidentification", Neural Computing and Applications (2022) 34: 17633-17645 (Year: 2022).*

Liu et al. "Survey for person re-identification based on coarse-to-fine feature learning", Multimedia Tools and Applications (2022) ( Year: 2022).*

Jiao Long, "Design and Implementation of Pedestrian Re-identification for Security Monitoring", China Master's Theses Full-text Database Information Technology Series, Sep. 30, 2021.

Han Zhiwei,, "Person Re-Identification in the Wild", China Master's Theses Full-text Database Information Technology Series, Jul. 31, 2022.

Shuren Zhou et al., "Occluded person re-identification based on embedded graph matching network for contrastive feature relation", Theoretical Advances, Nov. 18, 2022.

\* cited by examiner

OCCLUDED PEDESTRIAN RE-IDENTIFICATION METHOD BASED ON POSE ESTIMATION AND BACKGROUND SUPPRESSION

CROSS-REFERENCE TO RELATED APPLICATIONS

This application claims the priority of Chinese Patent Application No. 202211593464.9, filed on Dec. 13, 2022, which is hereby incorporated by reference in its entirety.

TECHNICAL FIELD

The present invention relates to occlusion pedestrian re-identification technology and belongs to the field of computer vision, more particularly to an occlusion pedestrian re-identification method based on pose estimation and background suppression specifically.

BACKGROUND

Pedestrian re-identification, as one of the important research topics in the field of computer vision, aims to correlate pedestrian images captured by different physical locations and different cameras to achieve pedestrian recognition and retrieval across cameras and scenes, which is widely used in smart business, intelligent security and other fields. However, in the real scene, the pedestrian images captured by the camera are often blocked by objects or other pedestrians, so the robust feature expression of pedestrians cannot be extracted.

The existing occluded person re-identification methods have achieved relatively good results, but they are still plagued by problems caused by occlusion: the features of the unoccluded part of the pedestrians is the key to the network identification of pedestrians, and if the occlusion feature is introduced into the model, the recognition ability will be reduced; matching the local pedestrian features can effectively improve the recognition ability of the model, but the occlusion will lead to the misalignment of the local pedestrian features, resulting in the wrong matching of local features. At the same time, the attention mechanism can assign weights to the visible part of the human body, which can effectively reduce the negative impact of the cluttered background.

Based on the above, the present invention proposes an occluded pedestrian re-identification method based on pose estimation and background suppression.

SUMMARY

The purpose of this invention is to propose an occluded pedestrian re-identification method based on pose estimation and background suppression for the shortcomings of existing technologies. Firstly, by constructing a graph convolutional module of local feature enhancement, we aim to embed the context information contained in the global feature into the local feature to enhance the expression of local features and obtain the connection between each feature node. At the same time, the heat map of the keypoints of the pedestrians and the feature map of overall pedestrians obtained by the pedestrian pose estimation module are used as two inputs of the attention-guided background suppression module to further focus the model on the visible part of pedestrians, so as to obtain the more robust feature expression of pedestrians.

The technical solutions adopted by the invention to solve the technical problems are as follows:

An occluded pedestrian re-identification method based on pose estimation and background suppression is characterized by including the following steps:

Step (1) Construct a pedestrian feature extraction backbone network based on ViT(Visual-Transformer) to obtain the global features $f_{cls}$ and the local features $f_{f\_local}$ of occluded pedestrians, and recombinant the local features $f_{f\_local}$ into the local feature map $f_{local}$.

Step (2) Obtain the heat map of the key-points of the pedestrian images $f_{pos}$ and the group of key-point confidences $V_{kc}$ by the pre-trained ViTPose (Human Pose Estimation), and then obtain the group of features of pedestrian key-points $f_{keypoints}$ by using the local feature map $f_{local}$ obtained in step(1) and the heat map $f_{pos}$.

Step (3) Construct a graph convolutional module of local feature enhancement composed of Conv and GCN, and then through Conv, obtain the local feature group $f_{kp\_en}$ by using the global features $f_{cls}$ to enhance the each key-point feature in the group of features of pedestrian key-points $f_{keypoints}$ and the adjacency matrix of key-points A is obtained through the key-points, and finally the local feature group $f_{kp\_en}$ and the adjacency matrix of key-points A are used as the input of GCN to obtain the final features of pedestrian key-points $f_{f\_keypoints}$.

Step (4) Construct an attention background suppression module composed of global average pooling and convolutional networks, and then the local feature map $f_{local}$ obtained by step(1) and the heat map $f_{pos}$ obtained by step(2) are input into the attention background suppression module to obtain the output pedestrian features $f_{att\_local}$, which are segmented as the final features.

Step (5) Construct an occluded pedestrian re-identification model(ReID) by the pedestrian feature extraction backbone network, ViTPose, the graph convolutional module of local feature enhancement and attention background suppression module, and then train the module using the global pedestrian features $f_{cls}$ in step(1), the features of pedestrian key-points $f_{f\_keypoints}$ in step(3) and the pedestrian features $f_{att\_local}$ in step(4) to obtain the final occluded pedestrian re-identification model.

The beneficial effects of the invention are as follows:

The invention designs a graph convolutional module of local feature enhancement, which uses the context information of global features to enhance the local feature expression of pedestrians and obtain the feature connection between each key-point of pedestrians. This is beneficial for the model to learn the features of the unoccluded pedestrian parts and realize the alignment of features between the pedestrian parts, thereby improving the recognition of the pedestrian features. Secondly, in order to reduce the influence of background information of pedestrian images, the invention designs an attention-guided background suppression module, which guides the model to pay more attention to the distinguishing features related to pedestrian features, so as to obtain more discriminative pedestrian features. The results show that the features extracted by this method have better robustness and effectively improve the generalization ability of the model.

DETAILED DESCRIPTIONS

The following is a further description of the invention in combination with the attached figures.

Figure 1:
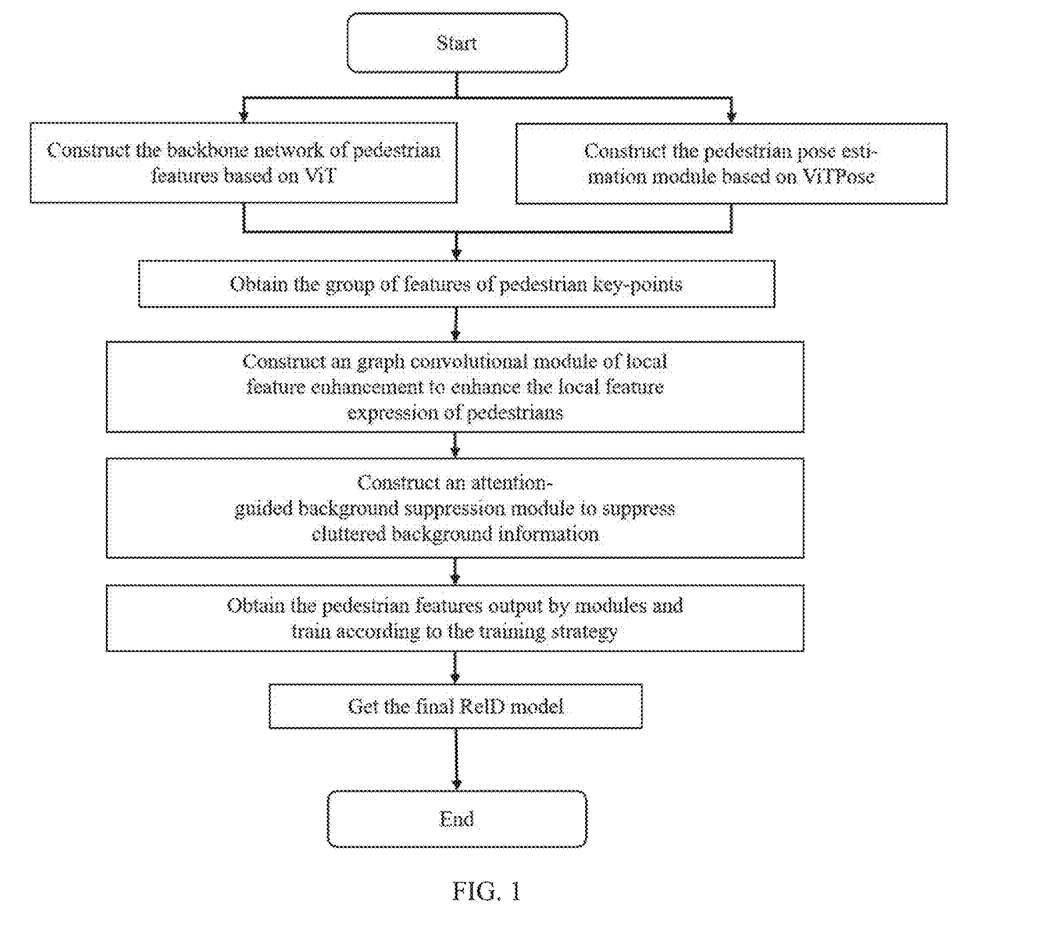
FIG. 1 is the flow chart of the overall implementation scheme of the invention.

FIG. 1 is the flow chart of the overall implementation scheme of the invention, illustrating an occluded pedestrian re-identification method based on pose estimation and background suppression, as shown in FIG. 1, including the following steps:

Step (1) Construct a pedestrian feature extraction backbone network based on Visual-Transformer to obtain the global features $f_{cls}$ and the local features $f_{f\_local}$ of occluded pedestrians, and recombinant the local features $f_{f\_local}$ into the local feature map $f_{local}$;

Step (2) Obtain the heat map of the key-points of the pedestrian images $f_{pos}$ and the group of key-point confidences $V_{kc}$ by the pre-trained pedestrian pose estimation module, and then obtain the group of features of pedestrian key-points $f_{keypoints}$ by using the local feature map $f_{local}$ obtained in step(1) and the heat map $f_{pos}$;

Step (3) Construct a graph convolutional module of local feature enhancement, and then use the global features $f_{cls}$ to enhance each key-point feature in the group of features of pedestrian key-points $f_{keypoints}$. The enhanced group of features and the adjacency matrix of key-points A are used as the input of the graph convolutional network to obtain the final features of pedestrian key-points $f_{f\_keypoints}$;

Step (4) Construct an attention-guided background suppression module, and then the local feature map $f_{local}$ obtained by step (1) and the heat map $f_{pos}$ obtained by step (2) are input into the attention background suppression module to obtain the output pedestrian features $f_{att\_local}$, which are segmented as the final features;

Step (5) Train the module using the global pedestrian features $f_{cls}$ in step (1), the features of pedestrian key-points $f_{f\_keypoints}$ in step (3) and the pedestrian features $f_{att\_local}$ in step(4) to obtain the final occluded pedestrian re-identification model.

Further, the specific implementation process of step (1) is as follows:

1-1 Use the pre-trained Visual-Transformer (ViT) on ImageNet as the backbone network to extract the pedestrian features in the image. Before the images are input into ViT, extract features from the images by a small convolutional network in order to deal with the problem of unstable ViT training., as shown in equation (1):

$$x = Conv(X) \quad (1)$$

here, X represents the pedestrian image, Conv represents the convolutional network, and x is the pedestrian features output by the convolutional network.

Figure 2:
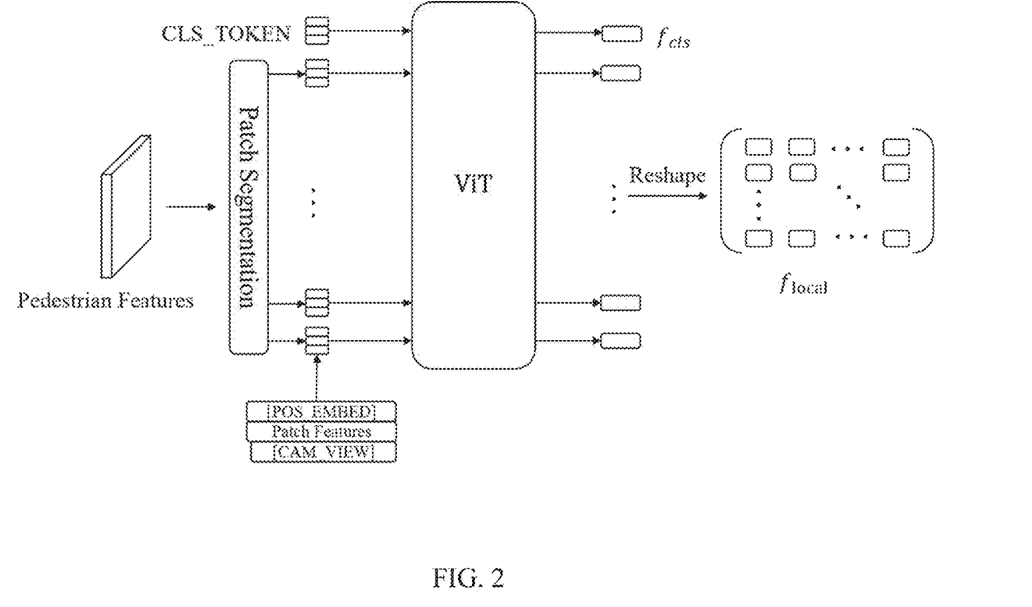
FIG. 2 is the schematic diagram of the backbone network of pedestrian feature extraction of the invention.

1-2 Refer to FIG. 2, the feature map sequence $x_p = \{x_p^i | i=1,2,\ldots N\}$ is generated by segmenting the pedestrian features x obtained in 1-1 according to the preset patch size p, among which N is a separable quantity, and then add the camera perspective information [CAM_VIEW] to $x_p$ the dimension of which is the same as $x_p$, as shown in equation(2):

$$x_p = x_p + \lambda * E_{cam\_view} \quad (2)$$

here, $\lambda$ is a hyperparameter representing the weight of the camera perspective information, and $E_{cam\_view}$ is [CAM_VIEW] representing the camera perspective information.

Add [CLS_TOKEN] representing the global feature and the position information coding [POS_TOKEN] to $x_p$, and then the feature Z can be obtained after linear coding, as shown in equation (3):

$$Z = [x_{cls}; linear(x_p^i)] + E_{pos} \quad (3)$$

here, $x_{cls}$ is the global feature vector [CLS_TOKEN]; linear($\cdot$) is a linear coding function; $E_{pos}$ is [POS_TOKEN] representing the spatial position.

1-3 Input the features Z obtained in 1-2 into ViT, which is stacked by multiple Transformer blocks, as shown in equations (4) and (5):

$$Z_l' = MSA(LN(Z_{l-1})) + Z_l - 1 l = 1 \ldots L \quad (4)$$

$$Z_l = MLP(LN(Z_l')) + Z_l' = 1 \ldots L \quad (5)$$

here, $Z_l$ represents the features of the output of the Transformer block in the l layer, $Z_l'$ is the intermediate result in the Transformer block, and L is the total number of layers; MSA($\cdot$) is the multi-head attention, LN($\cdot$) is the layer normalization, and MLP($\cdot$) is the multilayer perceptron.

The network output result is the output feature of the last layer, which are the global features $f_{cls} \in R^{1 \times C}$ and the local feature group $f_{f\_local}$. Rearrange the local feature group $f_{f\_local}$ and obtain the local feature map $f_{local}$, as shown in equation (6):

$$f_{local} = reshape(f_{f\_local}) \quad (6)$$

here, reshape($\cdot$) is the rearrangement function.

Figure 3:
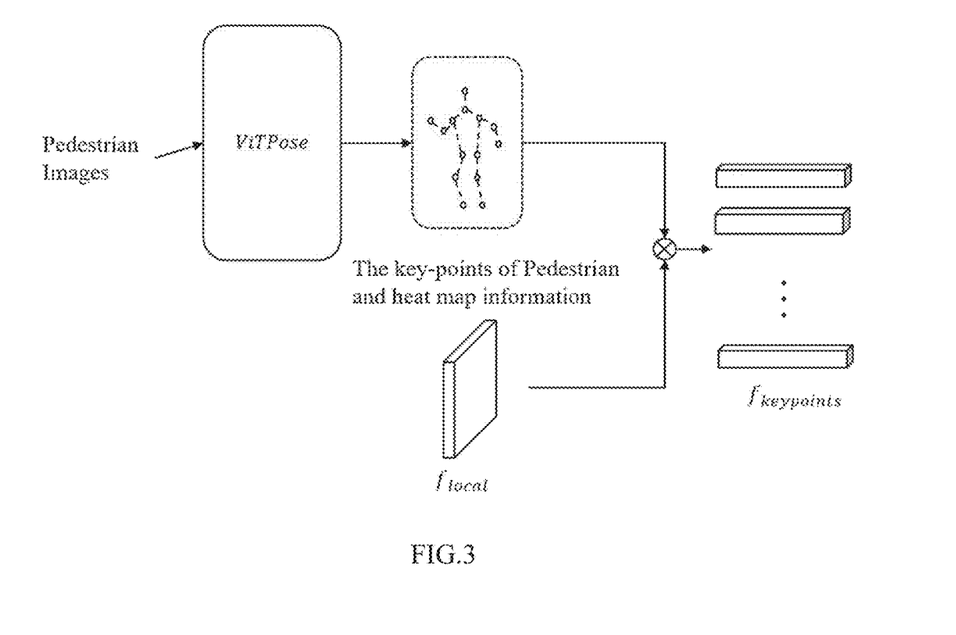
FIG. 3 is the schematic diagram of pedestrian pose estimation of the invention.

Further, the specific implementation process of step (2) is as follows:

2-1 Refer to FIG. 3, extract the key-points of the pedestrian images by ViTPose which is pre-trained on the CoCo dataset. The heat map of the pedestrian key-points $f_{pos}$ and the coordinate confidences of key-points $V_{kc}$ in the pedestrian images are obtained by ViTPose. In order to be used for pedestrian re-identification task, the final category of the model is selected for output and obtain the heat map of the pedestrian key-points $f_{pos}$ and key-point set $V_{kc} = \{V_1, V_2, \ldots, V_S\}$, among which, $V_s$ is the key-point of the human body obtained by the pedestrian key-point algorithm, as shown in equation(7):

$$f_{pos}, V_{kc} = ViTPose(Image) \quad (7)$$

here, $V_S = \{k_x, k_y, k_c\}$, $k_x$, $k_y$ are the coordinates of key-points respectively, and $k_c$ is the key-point confidence; $f_{pos}$ is the heat map of key-points output by ViTPose;

2-2 Using the obtained local feature map $f_{local}$ obtained in 1-3 and the heat map of the key-points of the pedestrians obtained in 2-1 $f_{pos}$, S local features of pedestrian key-points can be obtained by vector outer product and global average pooling, as shown in equation (8):

$$f_{keypoints} = GAP(f_{local} \otimes f_{pos}) \quad (8)$$

here, GAP is the global average pooling; the group of features of pedestrian key-points $f_{keypoints} \in R^{s \times c}$, S is the number of key-points and C is the number of feature channels.

Further, the specific implementation process of step (3) is as follows:

3-1 In the case of occlusion, the local features extracted in 2-2 often cannot represent the unoccluded part of the pedestrians robustly, while the context information contained in the global features can further enhance the expression of local features. Therefore, the relationship between global features and local features is used to further enrich local features. Firstly, the group of features of pedestrian key-points can be expressed as equation (9):

$$f_{keypoints}\{f_{keypoints}{}^i | i=0,1,\ldots,S\} \tag{9}$$

Secondly, apply 1*1 convolution to each key-point feature and global feature $f_{cls}$, as shown in equation (10)(11):

$$f_{kp\_conv}=\text{Conv}_{1\times1}(f_{keypoints}) \tag{10}$$

$$f_{cls\_conv}=\text{Conv}_{1\times1}(f_{cls}) \tag{11}$$

here, $f_{kp\_conv}$ is the feature after convolution of each local feature, and $f_{cls\_conv}$ is the feature after convolution of global features.

3-2 By using the features of key-points and global features obtained in 3-1, the local feature group of enhanced key-points $f_{kp\_en}$ calculated by vector quantity product, softmax and addition, as shown in equations (12) and (13):

$$V_{sim}=\text{Softmax}(f_{kp\_conv} \odot f_{cls\_conv}) \tag{12}$$

$$f_{kp\_en}=\text{Conv}(f_{keypoints}+w*(f_{cls\_conv}+V_{sim}*f_{cls})) \tag{13}$$

here, Conv 为 is the convolution operation; w is the learnable weight; $V_{sim}$ is the similarity.

3-3 By using the predefined adjacency matrix of pedestrian key-points A and the local feature group $f_{kp\_en}$ obtained in 3-2 as the input of the graph convolutional network, output the final features of pedestrian key-points $f_{f\_keypoints}$ by the graph convolutional network, as shown in equation (14):

$$f_{f\_keypoints}=GCN(A, f_{kp\_en}) \tag{14}$$

here, GCN is the graph convolutional network, and λ is a predefined adjacency matrix of human key-points.

Figure 4:
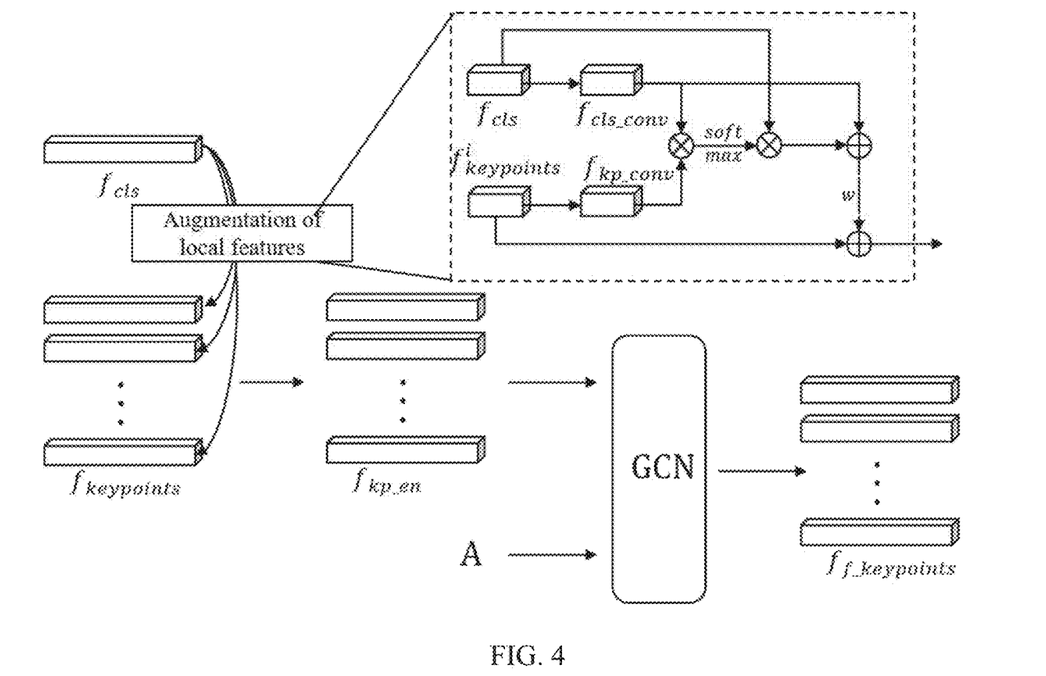
FIG. 4 is the schematic diagram of the convolution module of the local feature enhancement of the invention.

3-4 The process described in 3-1,3-2,3-3 constitute a graph convolutional module of local feature enhancement, with reference to FIG. 4.

Further, the specific implementation process of step (4) is as follows:

4-1 In order to guide the attention to further focus on the unoccluded part of the pedestrians, thereby suppressing the cluttered background, the global average pooling of the heat map of the key-points output by the pose estimation network is used as the features of pedestrian key-points, which is supplemented to the local features.

4-2 The local feature map output by backbone network is used as a graph structure, meaning there are H*W nodes in the graph and each node is a C-dimensional feature, and firstly input the local feature map $f_{local}$ into two 1*1 convolutional networks, and then transpose the output of one of the convolutional networks to construct the relationship between nodes, as shown in equation (15):

$$R_{i,j}=\text{Conv}(f_{local})^T \text{Conv}(f_{local}) \tag{15}$$

here, $R_{i,j}$ is the matrix of relational feature, and Conv is a convolutional network.

4-3 The matrix of relationship feature $R_{i,j}$ is used to obtain the features of spatial perception fs, of the corresponding relationship, and then embed the local feature map $f_{local}$, the features of pedestrian key-points $f_{pos}$ in 4-1 and the features of spatial perception $f_{sp}$ into the link, as shown in equation (16) and (17):

$$f_{sp}=\text{Conv}(R_{i,j}) \tag{16}$$

$$f_{concat}=\text{Concat}[\text{Conv}(f_{local}), \text{Conv}(f_{sp}), \text{Conv}(f_{pos})] \tag{17}$$

here, $f_{sp}$ are the features of spatial perception, Concat(·) is the channel link function, and $f_{concat}$ are the connected feature vectors.

Input $f_{concat}$ into a 1*1 convolutional network and Sigmod to obtain the spatial attention map fatten, and finally the final pedestrian feature map fatten is obtained by multiplying the spatial attention map $f_{local}$ with the local feature map $f_{att\_locall}$.

4-4 After that, according to the pedestrian structure construct multiple classification heads, and the pedestrian feature map $f_{att\_local}$ is divided into four local features, $f_1$, $f_2$, $f_3$, $f_4$, to classify the pedestrian images.

Figure 5:
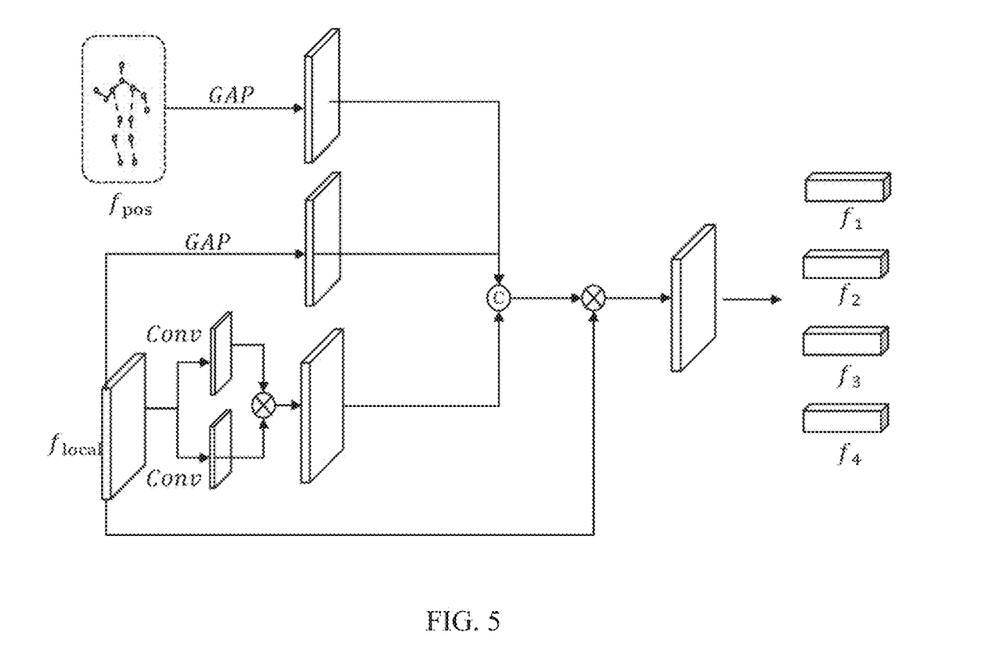
FIG. 5 is the schematic diagram of the attention-guided background suppression module of the invention.

4-5 The process described in 4-1, 4-2, 4-3, 4-4 constitutes the attention-guided background suppression module, with reference to FIG. 5.

Further, the specific implementation process of step (5) is as follows:

5-1 The labeled data in the pedestrian re-identification dataset is used as the supervision information, and use the ID loss which uses cross entropy loss to train the network and the difficult triplet loss to train the network for each training batch as shown in equation (18):

$$L_{id} = \sum_{i=1}^{N} -q_i \log(p_i) \tag{18}$$

here, N is the number of pedestrian categories, $q_i$ is the supervised label and $p_i$ is the predictive label.

Difficult triplet loss randomly samples P identities, each which extracts K instances to form a mini batch with a size of P*K; each picture $x_a$ in the batch is selected as the anchor point in turn, and the farthest positive sample picture $x_p$ and the nearest negative sample picture $x_n$ in the batch are selected to form a triple to train the network in order to enhance the generalization ability of the network, as shown in equation(19):

$$L_{triplet} = \sum_{i=1}^{P}\sum_{a=1}^{K}\left[m + \overbrace{\max_{1\leq p\leq K} \|f(x_{i,a}) - f(x_{i,p})\|_2}^{\text{hardest positive}} - \underbrace{\min_{\substack{n=1\ldots K \\ j=1\ldots P^{j\neq i}}} \|f(x_{i,a}) - f(x_{j,n})\|_2}_{\text{hardest negative}}\right]_+ \tag{19}$$

Figure 6:
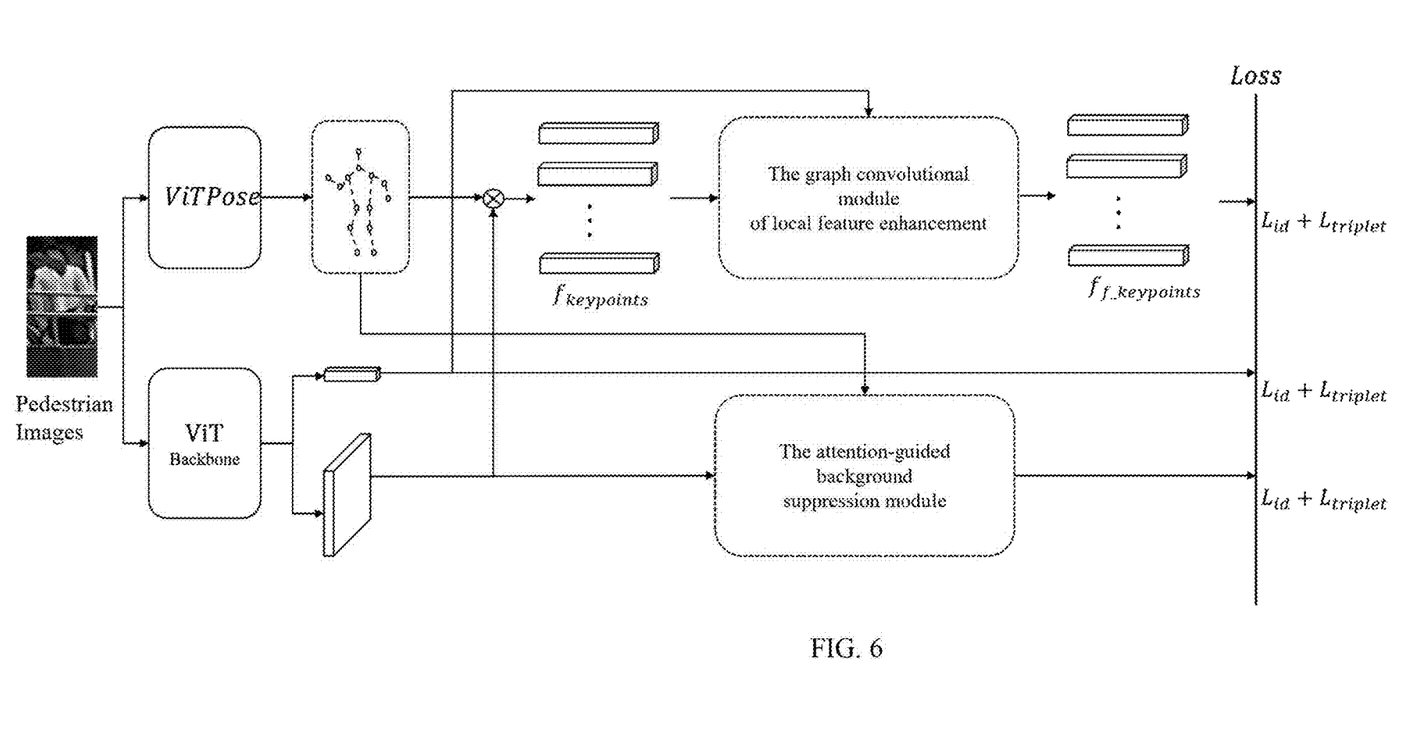
FIG. 6 is the overall structure diagram of the invention.

5-2 Refer to FIG. 6, it is the overall architecture of the network. According to $f_1, f_2, f_3, f_4$ generated by the global features $f_{cls}$ in 1-1, the final group of features of pedestrian key-points $f_{f\_keypoints}$ in 3-3 and the pedestrian features $f_{att\_local}$ in 4-4 division, train the occluded pedestrian re-identification model to obtain the final model, and the specific equation can be expressed as follows:

$$\text{Loss} = L_{id}(f_{cls}) + L_{triplet}(f_{cls}) + \frac{1}{S}\sum_{i=1}^{S}k_c^i[L_{id}(f_{f\_keypoints}^i) + L_{triplet}(f_{f\_keypoints}^i)] + \frac{1}{k}\sum_{i=1}^{k}(L_{id}(f_i) + L_{triplet}(f_i)) \quad (20)$$

here, S is the number of pedestrian key-points, and $k_c$ is the key-point confidence obtained in 2-1.

5-3 When the model is stable, the final ReID model is obtained. In the test stage, the key-point features of the images to be queried q and the test set images t are obtained by inputting q and t into the final occluded pedestrian re-identification model for feature extraction, which are $f_q$ and $f_t$ respectively and then use graph matching optimization comparison, as shown in equation (21):

$$GM = \frac{1}{S}\sum_{i=1}^{S}k_{c\_q}^i k_{c\_t}^i \text{cosine}(f_q^i, f_t^i) \quad (21)$$

here, $k_{c\_q}^i$ and $k_{c\_t}^i$ are the i-th key-point confidences of the image q and t respectively; cosine is the cosine distance.

5-4 Compare the query image features with the test set image features, whether the images belong to the same class, and output the same kind of pedestrian images.

What is claimed is:

1. An occluded pedestrian re-identification method based on pose estimation and background suppression, comprising steps of:
    step (1): constructing a pedestrian feature extraction backbone network based on ViT to obtain global features $f_{cls}$ and local features $f_{f\_local}$ of occluded pedestrians, and recombining the local features $f_{f\_local}$ into a local feature map $f_{local}$;
    step (2): obtaining a heat map of key-points of a pedestrian images $f_{pos}$ and a group of key-point confidences $V_{kc}$ according to a pre-trained ViTPose, and then obtaining a group of features of pedestrian key-points $f_{keypoints}$ by using the local feature map $f_{local}$ and the heat map $f_{pos}$;
    step (3): constructing a graph convolutional module of local feature enhancement composed of Conv and GCN, and then obtaining a local feature group $f_{kp\_en}$ by using the global features $f_{cls}$ to enhance each key-point feature in the group of features of pedestrian key-points $f_{keypoints}$ according to through Conv, and obtaining an adjacency matrix of key-points A through the key-points, and finally the local feature group $f_{kp\_en}$ and the adjacency matrix of key-points A are used as input of GCN to obtain final features of pedestrian key-points $f_{f\_keypoints}$;
    step (4): constructing an attention background suppression module composed of global average pooling and convolutional networks, inputting the local feature map $f_{local}$ obtained by step (1) and the heat map $f_{pos}$ obtained by step (2) into the attention background suppression module to output pedestrian features $f_{att\_local}$, segmenting the pedestrian features as final features final features;
    step (5): constructing an occluded pedestrian re-identification model by the pedestrian feature extraction backbone network, the ViTPose, the graph convolutional module of local feature enhancement and the attention background suppression module, and then training the occluded pedestrian re-identification module by using the global pedestrian features $f_{cls}$, the features of pedestrian key-points $f_{f\_keypoints}$ and the pedestrian features $f_{att\_local}$ to obtain a final occluded pedestrian re-identification model.

2. The method according to claim 1, wherein the pedestrian feature extraction backbone network is obtained based on an initial network of pedestrian feature extraction which adopting the ViT pre-trained on ImageNet, wherein before the images are input into ViT, extracting features from the images by a convolutional network, as shown in equation (1):

$$x = \text{Conv}(X) \quad (1)$$

wherein X represents the pedestrian image, Conv represents the convolutional network, and x is the pedestrian features output by the convolutional network.

3. The method according to claim 2, wherein the step of obtaining the global features $f_{cls}$ and the local features $f_{f\_local}$ of occluded pedestrians comprises: generating a feature map sequence $x_p = \{x_p^i | i=1,2,\ldots N\}$ by segmenting the obtained the pedestrian features x according to a preset patch size p, wherein N is a separable quantity, and then adding camera perspective information [CAM_VIEW] to $x_p$, the dimension of camera perspective information is the same as $x_p$, as shown in equation(2):

$$x_p = x_p + \lambda * E_{cam\_view} \quad (2)$$

wherein $\lambda$ is a hyperparameter representing the weight of the camera perspective information, and $E_{cam\_view}$ is [CAM_VIEW] representing the camera perspective information;
    adding [CLS_TOKEN] representing the global feature and the position information coding [POS_TOKEN] to $x_p$, and then feature Z can be obtained after linear coding, as shown in equation (3):

$$Z = [x_{cls}; \text{linear}(x_p^i)] + E_{pos} \quad (3)$$

wherein $x_{cls}$ is the global feature vector [CLS_TOKEN]; linear($\cdot$) is a linear coding function; $E_{pos}$ is [POS_TOKEN] representing the spatial position;
    inputting the feature Z into the ViT, wherein the ViT is stacked by multiple Transformer blocks, as shown in equation (4) and equation (5):

$$Z_l' = \text{MSA}(\text{LN}(Z_{l-1})) + Z_l - 1 l = 1 \ldots L \quad (4)$$

$$Z_l = \text{MLP}(\text{LN}(Z_l')) + Z_l' l = 1 \ldots L \quad (5)$$

wherein $Z_l$ represents the features of the output of the Transformer block in the l layer, $Z_l'$ is the intermediate result in the Transformer block, and L is the total number of layers;
MSA($\cdot$) is the multi-head attention, LN($\cdot$) is the layer normalization, and MLP($\cdot$) is the multilayer perceptron;
the network output result is the output feature of the last layer, which are the global features $f_{cls} \in R^{1 \times c}$ and the local feature group $f_{f\_local}$ respectively.

4. The method according to claim 1, wherein the acquisition of the local feature map $f_{local}$ comprises: rearranging the local feature group $f_{f\_local}$ as follows:

$$f_{local} \text{reshape}(f_{f\_local}) \qquad (6)$$

wherein reshape(·) is the rearrangement function.

5. The method according to claim 4, wherein the specific implementation process of step(2) comprises steps of step 2-1 to step 2-2:
step 2-1: extracting the key-points of the pedestrian images by ViTPose which is pre-trained on the CoCo dataset, and the heat map of the pedestrian key-points $f_{pos}$ and key-point set $V_{kc}=\{V_1, V_2, \ldots, V_S\}$ in the pedestrian images are obtained by ViTPose, among which, $V_S$ is the key-point of the human body obtained by the pedestrian key-point algorithm, as shown in equation(7):

$$f_{pos}, V_{kc} = \text{ViTPose(Image)} \qquad (7)$$

wherein $V_S = \{k_x, k_y, k_c\}$, $k_x$, $k_y$ are the coordinates of key-points respectively, and $k_c$ is the key-point confidence; $f_{pos}$ is the heat map of key-points output by ViTPose step 2-2: obtaining S local features of pedestrian key-points by using the local feature map $f_{local}$ and the heat map $f_{pos}$ according to vector outer producting and global average pooling, as shown in equation (8):

$$f_{keypoints} = GAP(f_{local} \otimes f_{pos}) \qquad (8)$$

wherein GAP is the global average pooling; the group of features of pedestrian key-points $f_{keypoints} \in R^{S \times C}$ S is the number of key-points and C is the number of feature channels.

6. The method according to claim 5, wherein obtaining the local feature group $f_{kp\_en}$ in step (3) comprises:
firstly, the group of features of pedestrian key-points can be expressed as equation (9):

$$f_{keypoints} = \{f_{keypoints}^i | i=0,1,\ldots,S\} \qquad (9)$$

secondly, apply 1*1 convolution to each key-point feature and the global feature $f_{cls}$, as shown in equation (10) and equation (11):

$$f_{kp\_conv} = \text{Conv}_{1\times 1}(f_{keypoints}) \qquad (10)$$

$$f_{cls\_conv} = \text{Conv}_{1\times 1}(f_{cls}) \qquad (11)$$

wherein $f_{kp\_conv}$ is the feature after convolution of each local feature, and $f_{cls\_conv}$ is the feature after convolution of global features;
lastly, by using the obtained group of features of pedestrian key-points $f_{keypoints}$ and global features $f_{cls}$, the local feature group of enhanced key-points $f_{kp\_en}$ is calculated by vector quantity product, softmax and addition, as shown in equation (12) and equation (13):

$$V_{sim} = \text{Softmax}(f_{kp\_conv} \odot f_{cls\_conv}) \qquad (12)$$

$$f_{kp\_en} = \text{Conv}(f_{keypoints} + w*(f_{cls\_conv} + V_{sim}*f_{cls})) \qquad (13)$$

wherein Cony is the convolution operation; w is the learnable weight; $V_{sim}$ is the similarity.

7. The method according to claim 6, wherein the method of obtaining the final features of pedestrian key-points $f_{f\_keypoints}$ in step (3) comprises:
by using the adjacency matrix of pedestrian key-points A and the local feature group $f_{kp\_en}$ as the input of the graph convolutional network, outputting the final features of pedestrian key-points $f_{f\_keypoints}$ by the graph convolutional network, as shown in equation (14):

$$f_{f\_keypoints} = GCN(A, f_{kp\_en}) \qquad (14)$$

wherein GCN is the graph convolutional network, and λ is a predefined adjacency matrix of human key-points.

8. The method according to claim 7, wherein the specific implementation process of step (4) comprises steps of step 4-1 to step 4-4:
step 4-1: performing global average pooling to the heat map of the key-points $f_{pos}$ to obtain the features of pedestrian key-points, and supplementing the features of pedestrian key-points to the local features $f_{f\_local}$;
step 4-2: using the local feature map $f_{local}$ as a graph structure, wherein the graph comprises H*W nodes and each node is a C-dimensional feature, inputting the local feature map $f_{local}$ into two 1*1 convolutional networks, and then transposing the output of one of the convolutional networks to construct the relationship between nodes, as shown in equation (15):

$$R_{i,j} = \text{Conv}(f_{local})^T \text{Conv}(f_{local}) \qquad (15)$$

wherein $R_{i,j}$ is the matrix of relational feature, and Conv is a convolutional network;
step 4-3: obtaining the features of spatial perception fs, of the corresponding relationship by using the matrix of relationship feature $R_{i,j}$, and then embedding the local feature map $f_{local}$, the features of pedestrian key-points $f_{pos}$ and the features of spatial perception fs, into a link, as shown in equation (16) and equation (17):

$$f_{sp} = \text{Conv}(R_{i,j}) \qquad (16)$$

$$f_{concat} = \text{Concat}[\text{Conv}(f_{local}), \text{Conv}(f_{sp}), \text{Conv}(f_{pos})] \qquad (17)$$

wherein $f_{sp}$ are the features of spatial perception, Concat(·) is the channel link function, and $f_{concat}$ are the connected feature vectors;
inputting the $f_{concat}$ into a 1*1 convolutional network and Sigmod to obtain a spatial attention map fatten, and finally a final pedestrian feature map $f_{att\_local}$ is obtained by multiplying the spatial attention map fatten with the local feature map $f_{local}$;
step 4-4: constructing multiple classification heads according to the pedestrian structure, and dividing the pedestrian feature map $f_{att\_local}$ into four local features, $f_1, f_2, f_3, f_4$, to classify the pedestrian images.

9. The method according to claim 8, wherein the specific implementation process of step (5) comprises steps of step 5-1 to step 5-4:
step 5-1: using labeled data in the pedestrian re-identification dataset as supervision information, and using ID loss and difficult triplet loss to train the network for each training batch as shown in equation (18), wherein the ID loss uses cross entropy loss:

$$L_{id} = \sum_{i=1}^{N} -q_i \log(p_i) \qquad (18)$$

wherein N is the number of pedestrian categories, qi is the supervised label and pi is the predictive label;
the difficult triplet loss randomly samples P identities, each identity extracts K instances to form a mini batch with a size of P*K; each picture $x_a$ in the batch is selected as the anchor point in turn, and the farthest positive sample picture $x_p$ and the nearest negative sample picture $x_n$ in the batch are selected to form a triple to train the network in order to enhance the generalization ability of the network, as shown in equation(19):

$$L_{triplet} = \sum_{i=1}^{P} \sum_{a=1}^{K} \left[ m + \overbrace{\max_{1 \le p \le K} \| f(x_{i,a}) - f(x_{i,p}) \|_2}^{\text{hardest positive}} - \underbrace{\min_{\substack{n=1 \ldots K \\ j=1 \ldots P^{j \ne i}}} \| f(x_{i,a}) - f(x_{j,n}) \|_2}_{\text{hardest negative}} \right]_+ \quad (19)$$

step 5-2: training the occluded pedestrian re-identification model according to $f_1$, $f_2$, $f_3$, $f_4$ generated by the global features $f_{cls}$, the final group of features of pedestrian key-points $f_{f\_keypoints}$ and the pedestrian features $f_{att\_local}$ division to obtain a final model, and the specific equation can be expressed as follows:

Loss = (20)

$$L_{id}(f_{cls}) + L_{triplet}(f_{cls}) + \frac{1}{S}\sum_{i=1}^{S} k_c^i \left[ L_{id}\left(f_{f\_keypoints}^i\right) + L_{triplet}\left(f_{f\_keypoints}^i\right) \right] +$$

$$\frac{1}{k}\sum_{i=1}^{k} (L_{id}(f_i) + L_{triplet}(f_i))$$

wherein S is the number of pedestrian key-points, and $k_c$ is the key-point confidence obtained in step 2-1;

step 5-3: in the test stage, inputting images to be queried q and test set images t into the final model for feature extraction, to obtain key-point features of the images to be queried q represented by $f_q$ and key-point features the test set images t represented by $f_t$, and using graph matching optimization comparison, as shown in equation (21):

$$GM = \frac{1}{S}\sum_{i=1}^{S} k_{c\_q}^i k_{c\_t}^i \cosine\left(f_q^i, f_t^i\right) \quad (21)$$

wherein $k_{c\_q}^i$ and $k_{c\_t}^i$ are the i-th key-point confidences of the image q and t respectively; cosine is the cosine distance;

step 5-4: comparing the query image features with the test set image features, judging whether the images belong to the same class, and output the same class of pedestrian images.

* * * * *